United States Patent [19]

Dixon

[11] Patent Number: 4,883,130

[45] Date of Patent: Nov. 28, 1989

[54] DUAL SPEED TRANSMISSION FOR AUTOMATIC ASSEMBLY MACHINE

[75] Inventor: Paul H. Dixon, Belvidere, Ill.

[73] Assignee: Dixon Automatic Tool, Inc., Rockford, Ill.

[21] Appl. No.: 238,487

[22] Filed: Aug. 31, 1988

[51] Int. Cl.$^4$ ............................................. B23Q 5/04
[52] U.S. Cl. ...................................... 173/12; 81/467; 81/473; 192/56 R
[58] Field of Search ................. 173/12; 81/467, 473; 192/0.032, 48.4, 56 R

[56] References Cited

U.S. PATENT DOCUMENTS

| | | | |
|---|---|---|---|
| 2,973,848 | 3/1961 | Dixon | 192/56 R |
| 2,989,996 | 6/1961 | Dixon | 81/475 |
| 3,696,871 | 10/1972 | Stenbacka | 173/12 |
| 3,845,673 | 11/1974 | Karden et al. | 173/12 X |
| 4,328,871 | 5/1982 | Gluskin | 173/12 |
| 4,513,827 | 4/1985 | Dubiel | 173/12 |
| 4,650,007 | 3/1987 | Fujita et al. | 173/12 |

Primary Examiner—Frank T. Yost
Assistant Examiner—James L. Wolfe
Attorney, Agent, or Firm—Leydig, Voit & Mayer, Ltd.

[57] ABSTRACT

The fastener driving tool of an automatic assembly machine is rotated by a two speed transmission which acts in conjunction with two torque-responsive clutches. Initially, the transmission rotates the driving tool at a high speed to effect fast driving of the fastener. After torque of predetermined magnitude has been applied to the fastener, one of the clutches torques out and, at that time, the transmission rotates the driving tool at a greatly reduced speed by way of the other clutch so that the fastener is rotated slowly during final tightening. When final tightening torque of predetermined magnitude is applied to the fastener, the second clutch torques out to stop rotation of the driving tool.

6 Claims, 2 Drawing Sheets

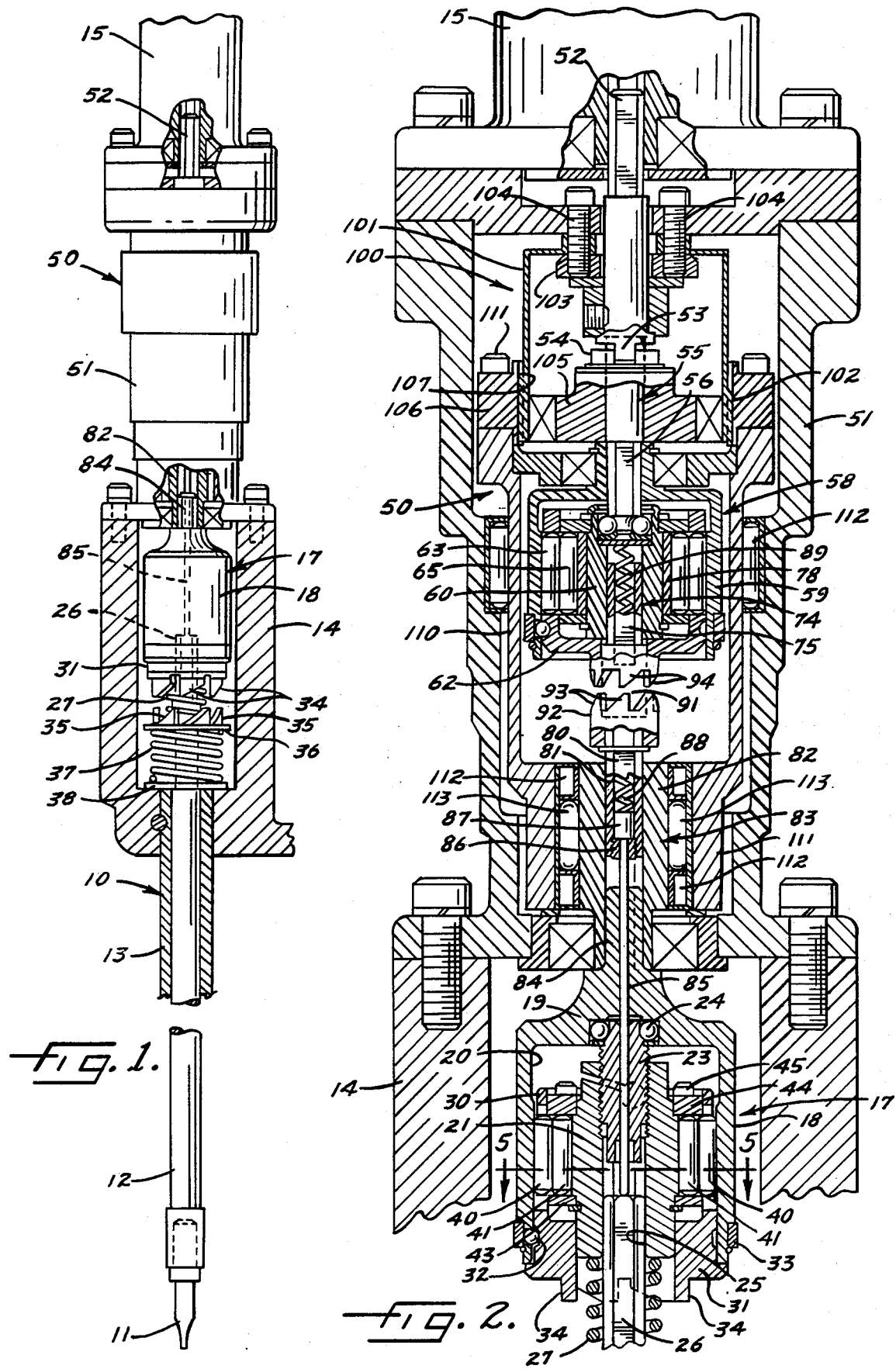

DUAL SPEED TRANSMISSION FOR AUTOMATIC ASSEMBLY MACHINE

BACKGROUND OF THE INVENTION

This invention relates to an automatic assembly machine and, more particularly, to an automatic assembly machine of the type which includes a rotary motor operable to drive an elongated spindle. The free end of the spindle carries a driver which is operable to tighten a threaded fastener such as a screw or a nut during rotation of the spindle.

An assembly machine of this general type is disclosed in Dixon U.S. Pat. No. 2,989,996. In that machine, a torque-responsive clutch is interposed in the drive between the motor and the spindle. When the fastener tightens and torque of a predetermined magnitude is imposed on the spindle, the clutch automatically disengages to interrupt the drive to the spindle and avoid overtorquing of the fastener.

It is desirable to drive the fastener at a high speed in order to achieve fast cycle times. During final tightening of the fastener, however, it is desirable to reduce the driving speed in order to better control the magnitude of the final torque applied to the fastener. In prior automatic assembly machines, there either is no provision for reducing the driving speed of the fastener just prior to final tightening without momentarily stopping rotation of the driver or, if such provision is made, a costly and complex electronic control is required.

SUMMARY OF THE INVENTION

The general aim of the present invention is to provide an automatic assembly machine having a new and improved two speed drive transmission which utilizes a speed reducer and a relatively simple and reliable torque-responsive clutch for automatically reducing the driving speed of the fastener during final tightening of the fastener without ever interrupting rotation of the fastener during tightening.

A more detailed object of the invention is to provide an automatic assembly machine in which the transmission includes a first output for driving the fastener at a high speed, a second output for driving the fastener at a slow speed, a first torque-responsive clutch for automatically switching the drive from a fast speed to a slow speed when torque of a predetermined magnitude is imposed on the fastener, and a second torque-responsive clutch for automatically interrupting the drive to the fastener when torque of a higher predetermined magnitude is imposed on the fastener.

These and other objects and advantages of the invention will become more apparent from the following detailed description when taken in conjunction with the accompanying drawings.

BRIEF DESCRIPTION OF THE DRAWINGS

FIG. 1 is a fragmentary side elevational view of an automatic assembly machine equipped with a new and improved two speed transmission incorporating the unique features of the present invention, certain parts being broken away and shown in section.

FIG. 2 is an enlarged fragmentary cross-sectional view of the drive transmission shown in FIG. 1.

DETAILED DESCRIPTION OF THE PREFERRED EMBODIMENT

Figure 3:
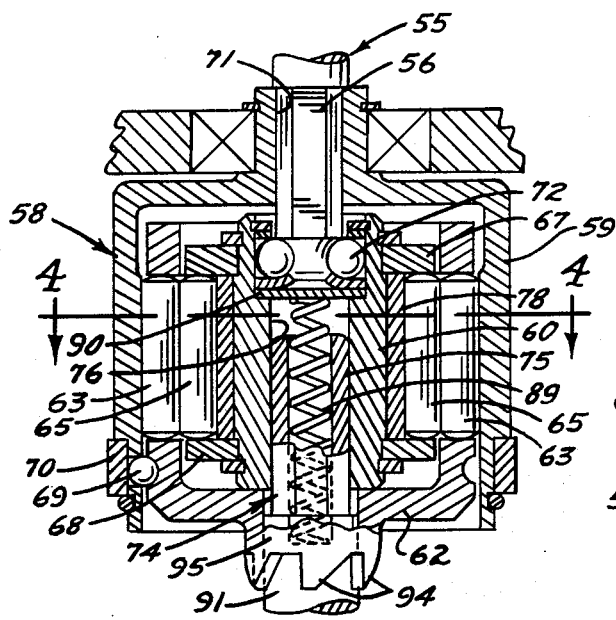
FIG. 3 is an enlarged cross-sectional view of one of the torque-responsive clutches shown in FIG. 2.

As shown in the drawings for purposes of illustration, the invention is embodied in an automatic assembly machine 10 such as a screwdriver of the same general type as disclosed in Dixon U.S. Pat. No. 2,989,996. The machine includes a tool in the form of a driver bit 11 which is carried on the lower end of an elongated and vertically extending spindle 12 adapted to be rotated about its own axis and adapted to be shifted upwardly and downwardly. The spindle is supported for rotation in a quill 13 which extends downwardly from a housing 14. A rotary air motor 15 supplies power to rotate the spindle and the bit while a reciprocating pneumatic actuator (not shown) serves to shift the motor 15, the housing 14, the spindle 12 and the bit 11 upwardly and downwardly.

In operation, screws are automatically fed one-by-one to the machine 10 and are successively driven into workpiece by the bit 11 as the latter rotates and moves downwardly. When torque of a predetermined magnitude is applied to each screw, rotation of the bit is automatically stopped and the penumatic actuator retracts the bit upwardly.

Located in the housing 14 is a torque-responsive clutch 17 which preferably is the same type as the clutch disclosed in Dixon U.S. application Ser. No. 238,417, filed Aug. 31, 1988 and entitled Torque-Responsive Clutch. The clutch 17 includes an outer tubular driving member 18 which is adapted to be rotated by the motor 15 in a manner to be described subsequently. The driving member has a closed upper end 19 (FIG. 2) and is formed with a bore 20 of circular cross-section. Disposed in the bore is an inner driven member 21 (FIGS. 2 and 5) which also is of circular cross-section. The driven member is also tubular and its upper end portion is internally threaded. An externally threaded stud 23 is screwed into the driven member 21 and is rotatably supported in the closed end 19 of the driving member 18 by a ball bearing 24.

As shown in FIG. 2, a hexagonal bore 25 is formed in the lower end portion of the driven member 21. A hexagonal extension 26 is formed on the upper end of the spindle 12 and is telescoped into the bore 25. When the driver bit 11 engages a screw, downward movement of the bit and the spindle 12 is momentarily stopped while the housing 14 continues to move downwardly. During such downward movement of the housing 14, the upper end portion 26 of the spindle 12 telescopes deeper into the bore 25 in the driven member 21. When the driver bit is retracted upwardly, a coil spring 27 (FIGS. 1 and 2) on the upper end portion 26 of the spindle 12 forces the spindle downwardly. The spring is compressed between the lower end of the driven member 21 and a flange (not visible) on the upper end portion 26 of the spindle.

Disposed between the driving and driven members 18 and 21 of the clutch 17 is an intermediate member or cage 30 (FIG. 5) having a lower hub 31 (FIG. 2) which is rotatably journaled on the lower end portion of the driven member 21. The hub 31 of the cage 30 also is rotatably journaled in the lower end portion of the driving member 18 by a series of angularly spaced balls 32 located between the hub and the driven member. A ring 33 encircles the lower end portion of the driving member 18 to hold the balls in place.

Formed on and projecting downwardly from the lower end of the hub 31 are several angularly spaced lugs 34 (FIG. 1). For a purpose to be described subsequently, the lugs 34 are adapted to coact with a similar number of angularly spaced cam segments 35 projecting upwardly from a ring 36 which rotates with and slides on the hexagonal upper end portion 26 of the spindle 12. A coil spring 37 is telescoped over the upper end portion 26 of the spindle 12 and is compressed between the ring 36 and a washer 38 to urge the ring upwardly. The washer 38 encircles the upper end portion 26 of the spindle 12 and abuts a shoulder defined at the junction between the upper end portion of the spindle and the main length thereof.

Figure 5:
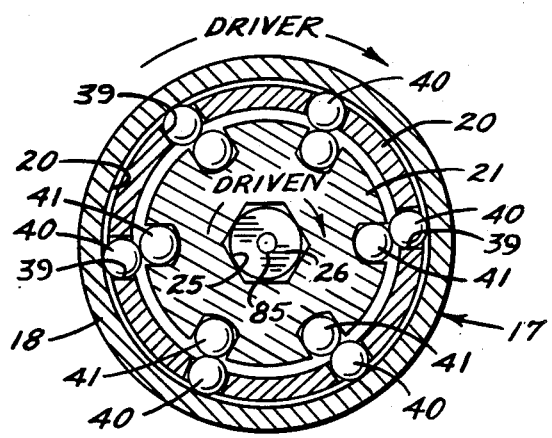
FIG. 5 is a cross-section taken along the line 5—5 of FIG. 2.

The upper end portion of the cage 30 is formed with six angularly spaced and vertically extending slots 39 (FIG. 5). Rollers 40 are located in the slots and are free to turn about axes paralleling the driving and driven members 18 and 21 of the clutch 17. To engage the clutch, the rollers 40 are cammed outwardly into wedging or crowded engagement with the wall of the bore 20 of the driving member 18 and, as a result of such engagement, couple the driven member 21 to rotate in unison with the driving member. The rollers are cammed outwardly into crowded engagement with the driving member by a second set of six rollers 41 (FIG. 5) carried by and rotatable within angularly spaced and vertically extending grooves 42 in the driven member. A retainer plate 43 (FIG. 2) is secured to the hub 31 of the cage 30 and engages the lower ends of the rollers 41 to captivate such rollers against downward movement. Upward movement of the rollers 41 is prevented by a retainer plate 44 which is held against the upper ends of the rollers 41 by screws 45 extending through the retainer plate 44. The retainer plates 43 and 44 also engage the ends of the rollers 40 to hold those rollers at the same elevation as the rollers 41.

In operation of the screwdriver 10 as described thus far, the motor 15 is energized continuously during the downstroke of the screwdriver and acts to rotate the driving member 18 of the clutch 17 in a manner to be described subsequently. The driving member 18 rotates clockwise when viewed from the top of FIG. 2. During rotation of the driving member, the wall of the bore 20 acts against the rollers 40 and tends to turn those rollers and the cage 30 clockwise (FIG. 5). When the rollers 40 encounter the rollers 41, the rollers 41 cam the rollers 40 radially outwardly and cause the rollers 40 to become crowded or wedged between the driving member 18 and the rollers 41. As a result of such engagement, rotation of the driving member 18 is transmitted to the driven member 21 so as to turn the driver bit 11.

As the screw is driven by the driver bit 11, the resistance of the screw to tightening increases progressively and thus the screw imposes resistance torque tending to retard clockwise rotation of the driven member 21 and the rollers 41. When the resistance torque reaches a predetermined magnitude (e.g., 120 inch-pounds), the rollers 40 sprag over the rollers 41 to release the coupling between the driving and driven members 18 and 21 and thereby permit the driving member to rotate without turning the driven member and the driver bit 11 and imposing excessive tightening torque on the screw. By turning the driven member 21 on the threaded stud 23, the magnitude of torque at which the clutch 17 torques out may be adjusted in the manner disclosed in the above-identified application.

The lugs 34 on the hub 31 of the cage 30 and the segments 35 on the ring 36 coact to positively shift the cage clockwise to engage the clutch 17 and then to prevent the clutch from re-engaging after torquing out. When the driver bit 11 first engages the screw, the downwardly moving clutch 17 overtakes the ring 36 to cause the lugs 34 to engage the segments 35 about midway along the height of the segments. As an incident to such engagement, the segments cam against the lugs and turn the cage 30 clockwise relative to the driven member 21 so as to positively bring the rollers 40 into driving relation with the rollers 41. As the clutch 17 continues to move downwardly, the spring 37 yields to enable the ring 36 to move downwardly under the axial force exerted by the cage 30.

When the clutch 17 torques out, the cage 30 turns clockwise through a short increment relative to the driven member 21 as the rollers 40 pass over the rollers 41. As a result of such turning, the segments 35 move upwardly into a fully seated position between the lugs 34 so as to prevent any further rotation of the cage 30 relative to the driven member 21. This prevents the rollers 40 from reaching the immediately preceding rollers 41 and thus prevents the clutch 17 from re-engaging once torque-out has occurred. When the driver bit 11 is retracted upwardly from the work, the spring 27 forces the spindle 12 and the ring 36 downwardly so as to move the segments 35 downwardly from the lugs 34 and permit engagement of the clutch 17 during the next cycle.

To summarize briefly, the motor 15 rotates the driver bit 11 by way of the clutch 17 until the screw is tight and the clutch torques out. The driver bit then is retracted preparatory to driving the next screw.

In order for the screwdriver 10 to achieve fast cycle times, it is necessary to rotate the screw at a high speed. If, however, the screw is rotated at a high speed during final tightening, the momentum and inertia of the various drive components can seriously affect the point at which the clutch 17 actually torques out and releases. As a result, the final torque applied to the screws can vary from screw-to-screw even though the clutch 17 ostensibly releases at a fixed predetermined torque.

According to the present invention, the clutch 17 is driven by a unique two speed mechanical transmission 50 which causes the driver bit 11 to rotate at a very fast speed during initial tightening of the screw and then, without ever stopping, to rotate at a significantly slower speed as the screw is finally tightened. As a result, the effect of momentum and inertia on the clutch 17 is substantially reduced so as to cause the clutch to torque out at more uniform magnitudes and achieve greater uniformity of the final torque to which the screws are tightened.

More specifically, the transmission 50 includes a housing 51 (FIG. 2) which is located between and is secured to the housing 14 and the motor 15. A hexagonal shaft 52 extends upwardly from the housing 51 and is connected for rotation by the motor. The lower end portion of the shaft carries the driving lug 53 of an Oldham coupling having a driven lug 54 located on the upper end of a shaft 55 having a hexagonal lower end portion 56. The shaft 55 constitutes the input of the transmission 50.

Figure 4:
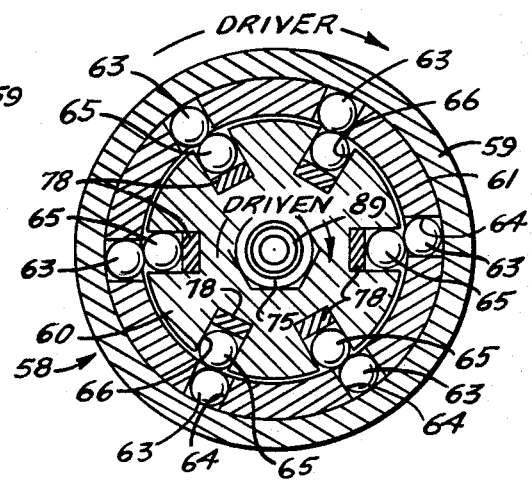
FIG. 4 is a cross-section taken along the line 4—4 of FIG. 3.

The lower end portion 56 of the shaft 55 serves to drive a torque-responsive clutch 58 (FIGS. 3 and 4)

which is very similar to the clutch 17. Thus, the clutch 58 includes a tubular driving member 59; an inner driven member 60; an intermediate cage 61 having a hub 62; rollers 63 supported in slots 64 (FIG. 4) in the cage 61; rollers 65 supported in grooves 66 in the driven member 60, upper and lower retainers 67 and 68 (FIG. 3) for holding the rollers; balls 69 journaling the hub 62 of the cage 61 for rotation in the driving member 59, and a ring 70 for retaining the balls 69. The hexagonal lower end portion 56 of the input shaft 55 is telescoped into a similarly shaped bore 71 in the driving member 59 and thus serves to rotate the latter. At its extreme lower end, the shaft 55 is journaled by a bearing 72 located in the driven member 60, the bearing also serving as a thrust bearing.

A vertical shaft 74 (FIG. 3) is formed with a hexagonal and tubular upper end portion 75 which is telescoped into a hexagonal bore 76 in the driven member 60 of the clutch 58. When the driving member 59 is rotated clockwise by the shaft 55, the wall of the bore in the driving member tends to turn the rollers 63 and the cage 61 clockwise. When the rollers 63 encounter the rollers 65, the rollers 65 cam the rollers 63 radially outwardly and cause the rollers 63 to become crowded or wedged between the driving member 59 and the rollers 65. By virtue thereof, rotation of the driving member 59 is transmitted to the driven member 60 so as to turn the shaft 74.

As the screw is tightened by the bit 11, the resistance torque retards clockwise rotation of the shaft 74. When the resistance torque reaches a predetermined magnitude (e.g., 40 inch-pounds), the rollers 63 sprag over the rollers 65 to release the coupling between the driving and driven members 59 and 60 and thereby permit the driving member 59 to rotate without rotating the driven member 60 and the shaft 74. Spacers 78 (FIG. 4) are located between the balls 65 and the bottoms of the grooves 66 in the driven member 60 and control the magnitude of the torque at which the clutch 58 torques out. By replacing the spacers 78 with spacers having a greater thickness, the magnitude of the torque at which the clutch 58 torques out may be made greater. Conversely, the use of spacers having a lesser thickness than the spacers 78 causes the clutch 58 to torque out at a torque of lower magnitude.

The shaft 75 also includes a hexagonal and tubular lower end portion 80 which is telescoped slidably into a hexagonal bore 81 formed axially through the inner member or race 82 of an overrunning clutch 83 such as a Torrington one-way clutch. Projecting into the lower end of the bore 81 is a hexagonal stub shaft 84 formed integrally with and extending upwardly from the driving member 18 of the lower clutch 17. By virtue of the fit between the hexagonal bore 81 and the hexagonal stub shaft 84, the driving member 18 of the torque-responsive clutch 17 is rotated whenever the inner race 82 of the overrunning clutch 83 is rotated. The inner race 82 of the clutch 83 constitutes the output of that clutch.

Means are provided for positively engaging the torque responsive clutch 58 when the driver bit 11 first contacts the screw and for holding the clutch 58 out of engagement once the clutch torques out. Herein, these means include a long, vertical plunger 85 (FIG. 2) having a lower end disposed in engagement with the upper end of the spindle 26. The plunger 85 extends upwardly through holes formed in the stud 23 and in the closed end wall 19 and shaft 84 of the driving member 18 of the clutch 17. The plunger 85 extends upwardly into the bore 81 in the inner race 82 of the clutch 83 and then extends into the tubular lower end portion 80 of the shaft 74. A bushing 86 is threaded into the lower end portion 80 of the shaft 74 and slidably receives the plunger 85. A head 87 is fixed to and is carried by the upper end of the plunger 85 and is telescoped into the tubular shaft portion 80 with a snug but slidable fit. Located in the tubular shaft portion 80 is a coil spring 88 which engages the head 87 and urges the plunger 85 downwardly. Another coil spring 89 (FIG. 3) is located within the upper tubular portion 75 of the shaft 74 and is compressed against a disc 90 located in the driven member 60 of the clutch 58 adjacent the lower end of the bearing 72. The spring 89 urges the shaft 74 downwardly.

The shaft 74 includes a solid intermediate portion 91 which is located between the tubular upper and lower end portions 75 and 80. Fixed to the lower tubular shaft portion 80 just beneath the solid intermediate portion 91 is a jaw member 92 (FIG. 2) having several angularly spaced and upwardly projecting cam segments 93. The latter are adapted to coact with downwardly projecting lugs 94 formed integrally with and spaced angularly around a collar 95 (FIG. 3) on the lower end of the hub 62 of the cage 61 of the clutch 58.

When the driver bit 11 first engages the screw, and as the housing 51 continues to move downwardly with the housing 14, the spindle 26 momentarily stops downward movement of the plunger 85. At first, the spring 88 merely compresses and permits the shaft 74 to move downwardly. Thereafter, however, the spring 88 acts as a substantially rigid link and prevents further downward movement of the shaft 74. As a result, the lugs 94 on the cage 61 of the clutch 58 move downwardly into engagement with the cam segments 93 on the jaw 92. By virtue of such engagement, the segments 93 cam the cage 61 clockwise to positively bring the rollers 63 into engagement with the rollers 65 and to cause the rollers 65 to crowd the rollers 63 outwardly for purposes of engaging the clutch 58. The plunger 85 is of such length that the clutch 58 engages slightly ahead of the clutch 17. The initial yielding of the spring 88 accommodates tolerances and differences in timing.

When the clutch 58 torques out, the lugs 94 on the cage 61 turn a short distance in a clockwise direction relative to the cam segments 93 of the jaw 92. The spring 88 thus forces the cam segments 93 upwardly into full meshing engagement with the jaws 94 to prevent further relative rotation of the cage 61 and to prevent the clutch 58 from re-engaging after torque-out.

When the housing 51 is retracted upwardly following driving of the screw, the spring 89 forces the shaft 74 downwardly within the bores 76 and 81. Such downward movement of the shaft 74 positively retracts the cam segments 93 downwardly away from the lugs 94 so that the clutch 58 may re-engage during the next cycle.

Pursuant to the invention, the transmission 50 includes a speed reducer 100 (FIG. 2) which enables the clutch member 82 (and thus the driver bit 11) to rotate at a fast speed as long as the upper torque-responsive clutch 58 is engaged. When the clutch 58 torques out, the clutch member 82 and the driver bit 11 are rotated at a much slower speed by way of the speed reducer.

The speed reducer 50 which is used herein is a commercially available harmonic drive gear reducer of the type identified as Model 1C and sold by The Harmonic Drive Division of The Emhart Machinery Group, Wakefield, Mass. 01880. The harmonic drive reducer per se is well known and its specific construction does not form part of the present invention. Briefly, however, the speed reducer includes a so-called Flexspline 101 (FIG. 2) which is a non-rigid gear having external teeth 102 formed therearound. In this instance, the Flexspline is a fixed member which is anchored to the housing 51 by a clamp 103 and screws 104. Disposed inside of the Flexspline and connected to be rotated by the shaft 55 is a Wave Generator 105 in the form of an elliptical ball bearing assembly. The reducer 100 is completed by a so-called Circular Spline 106 in the form of a rigid internal gear located outside of the Flexspline 101 and having teeth 107 which mesh with the teeth 102 of the Flexpline. When the Wave Generator 105 is driven by the shaft 55 rotating at a given speed, it coacts in a known manner with the Flexspline 101 to cause the Circular Spline 106 to rotate at a much slower speed. In the present instance, the speed reduction is in the neighborhood of 60 to 1.

The Circular Spline 106 of the speed reducer 100 is connected to a torque tube 110 (FIG. 2) by screws 111. The torque tube is rotatably supported within the housing 51 by a bearing 112 and extends downwardly to the one-way clutch 83. The torque tube includes a lower sleeve 111 which forms one output of the transmission 50 and which defines the outer race of the clutch 83. Needle bearings 112 and sprag rollers 113 are located between the inner and outer races 82 and 111 of the clutch 83. The clutch 83 is of the type in which the inner race 82 is driven directly by the shaft 74 as long as the speed of that shaft is greater than the speed of the outer race or sleeve 111 connected to the torque tube 110. If the speed of the sleeve 111 is greater than that of the shaft 74, the inner race 82 is driven by the sleeve. The shaft 74 defines another output of the transmission 50.

In describing the operation of the machine 10, it will be assumed that the driver bit 11 has just contacted the screw and that downward movement of the housing 14 has continued sufficiently far relative to the spindle 12 to cause engagement of both of the torque-responsive clutches 17 and 58. During initial driving of the screw, the motor 15 acts through the transmission input shaft 55 to rotate the output shaft 74 at a high speed by way of the clutch 58 and to rotate the output defined by the torque tube 110 and the sleeve 111 at a much slower speed by way of the speed reducer 100. Under these conditions, the shaft 74 directly rotates the inner race 82 of the clutch 83 at a high speed, and the inner race drives the shaft 84 to cause the torque-responsive clutch 17 to rotate the driver bit 11 at a high speed. The driver bit may, for example, rotate at 2,000 R.P.M. when the drive to the bit is by way of the shaft 74.

Driving of the bit 11 at high speed continues until the resistance torque of the screw causes the clutch 58 to torque out at approximately 40 inch-pounds. At this time, positive rotation of the shaft 74 is interrupted and thus the inner race 82 of the clutch 83 is rotated at a much slower speed (e.g., 33⅓ R.P.M.) by the sleeve 111 of the torque tube 110. The inner race 82 acts through the shaft 84 and the clutch 17 to rotate the driver bit 11 at the slow speed during final driving of the screw. When the screw has been tightened with predetermined torque of about 120 inch-pounds, the clutch 17 torques out to interrupt the drive to the bit 11 and then the bit is retracted upwardly preparatory to the next cycle.

From the foregoing, it will be apparent that the present invention brings to the art a new and improved two speed transmission 50 in which a screw is driven at high speed until a predetermined torque is applied to the screw and thereafter is driven at a much slower speed during final tightening and until a predetermined torque of a higher magnitude is applied to the screw. Because final tightening of the screw is effected at low speed, the effect of inertia and momentum in the drive system is significantly reduced so as to enable the clutch 17 to torque out when the torque more nearly reaches an optimum magnitude established as a function of the initial setting of the clutch. Thus, screws of a like type are tightened to a higher degree of uniformity so as to reduce the range between highly and lowly torqued screws. The two speed transmission 50 does not require costly electronic components and, in addition, enables the use of a smaller pneumatic motor 15 with less air consumption. This is because the speed reducer 100 greatly amplifies the torque of the motor.

When the transmission 50 shifts speeds, the drive to the screw is not in any way interrupted. Because the drive is not stopped even momentarily during speed shifts, high cycle rates can be achieved.

I claim:

1. An automatic assembly machine having a rotatable spindle and a rotary motor, and a drive transmission for causing said motor to rotate said spindle first at a fast speed and then at a significantly slower speed, said transmission having a rotatable input and having first and second rotatable outputs, said motor being connected to said input and being operable to rotate said input, a torque-responsive clutch coupled between said input and said first output and operable to cause said input to rotate said first output at said fast speed as long as the torque imposed on said first output is below a predetermined magnitude, said clutch automatically releasing and interrupting the drive between said input and said first output when the torque imposed on said first output exceeds said predetermined magnitude, means coupling said input to said second output and causing said input to rotate said second output at a speed significantly slower than said fast speed, and a second clutch operable to cause said first output to rotate said spindle as long as the speed of said first output exceeds the speed of said second output, and said second clutch being operable to cause said second output to rotate said spindle when the drive between said input and said first output is interrupted by said torque-responsive clutch.

2. An automatic assembly machine as defined in claim 1 in which said second clutch includes a rotatable output, an additional torque-responsive clutch connected between said spindle and the output of said second clutch and operable to cause said second clutch to drive said spindle as long as the torque imposed on said spindle is below a second predetermined magnitude higher than said first predetermined magnitude, and said additional torque-responsive clutch automatically releasing and interrupting the drive between said second clutch and said spindle when the torque imposed on said spindle exceeds said second predetermined magnitude.

3. An automatic assembly machine as defined in claim 2 in which said spindle is supported to move endwise relative to said torque-responsive clutches, and means responsive to endwise movement of said spindle in one direction to cause said torque-responsive clutches to engage.

4. An automatic assembly machine as defined in claim 3 in which said responsive means cause said first torque-responsive clutch to engage prior to said additional torque-responsive clutch.

5. An automatic assembly machine as defined in claim 1 in which said torque-responsive clutch comprises an outer tubular member having a bore of circular cross-section, an inner member of circular cross-section disposed inside of said outer member in radially spaced relation therefrom said members comprising rotatable driving and driven members, and means for causing said driving member to selectively transmit torque to said driven member and for releasing the driving member for rotation relative to the driven member when the torque exceeds said predetermined magnitude, said means comprising a cage disposed between said members and adapted to be turned through a limited distance relative to said members, a first set of cylindrical rollers spaced angularly around said cage, said rollers being carried by said cage to rotate through said limited distance with said cage and being supported to rotate relative to said cage about axes paralleling the rotational axis of the cage, and a second set of cylindrical rollers located between said cage and one of said members, the rollers of said second set being spaced angularly from one another and being supported to rotate about axes paralleling said rotational axis, the rollers of said second set being positioned to cam the rollers of said first set radially when said cage is rotated in one direction relative to said members and being operable as an incident thereto to force the rollers of the first set into crowded engagement with the other member so as to cause said driving member to transmit torque to said driven member, and the rollers of said second set releasing the rollers of said first set when said cage is rotated further in said one direction relative to said driven member whereby the rollers of the first set release said other member and permit free rotation of said driving member relative to said driven member.

6. An automatic assembly machine as defined in claim 5 in which said outer member is said driving member and said inner member is said driven member, the rollers of said second set being located between said cage and said driven member adjacent the outer periphery of said driven member, the outer periphery of said driven member being formed with angularly spaced grooves for receiving the rollers of said second set, and replaceable spacer means between each of said grooves and each of the rollers of said second set and causing the rollers of said second set to project radially outwardly a predetermined distance beyond the outer periphery of said driven member.

* * * * *